Feb. 3, 1925.

J. R. GAMMETER

BATTERY JAR TESTING APPARATUS

Filed Dec. 7, 1920

Inventor
J. R. Gammeter
By Robert M. Pierson,
Atty.

Patented Feb. 3, 1925.

1,525,286

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

BATTERY-JAR-TESTING APPARATUS.

Application filed December 7, 1920. Serial No. 428,873.

*To all whom it may concern:*

Be it known that I, JOHN R. GAMMETER, a citizen of the United States, residing at Akron, in the county of Summit and State of Ohio, have invented a certain new and useful Battery-Jar-Testing Apparatus, of which the following is a specification.

This invention relates to apparatus for testing the dielectric qualities of receptacles such as storage-battery jars, or other articles, by means of a disruptive electrical discharge and it has for its principal objects to provide a more satisfactory means than has heretofore been known for subjecting the article to currents of high voltage, whereby, certain advantages are secured in the way of a more rapid and perfect testing and a greater safety to the operators. Battery jars, for example, are now tested by placing them on metal mandrels connected in a circuit of about 1800 volts, and passing an iron rod connected in the same circuit over the outside of the jars to cause sparks to pass from the rod through imperfections in the jars to the mandrels. This method is dangerous to the workmen who handle the rods, and is unsatisfactory for imperfections in the jar and especially along its corner edges where the sides have been joined in building, are not found unless the workmen use great care. My invention overcomes these difficulties and provides an expeditious automatic machine for performing the testing.

Figure 1:
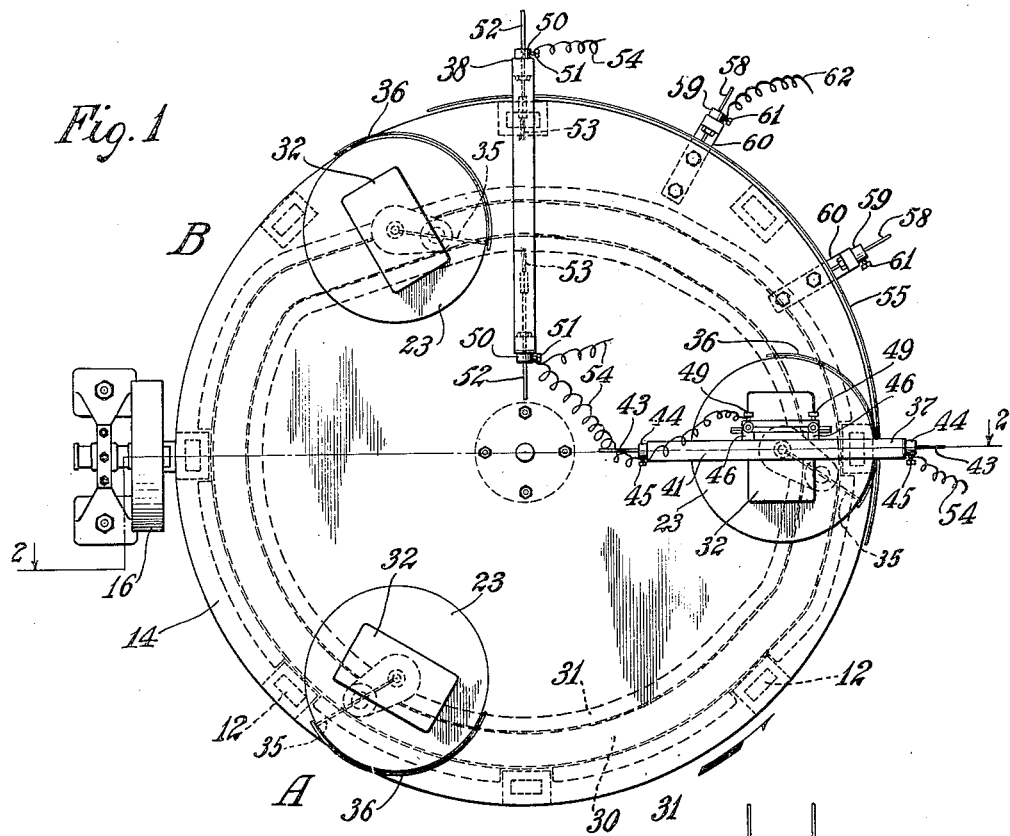
Fig. 1 is a plan view of a battery jar testing apparatus embodying my invention.
Figure 2:
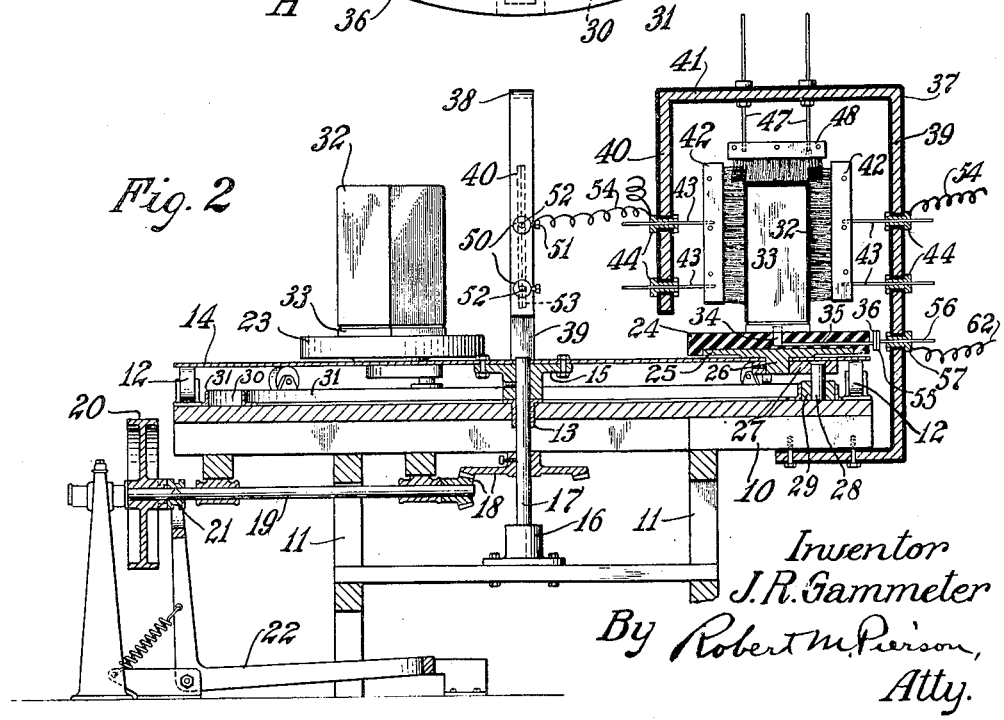
Fig. 2 is a sectional view thereof taken on the line 2—2 of Fig. 1.

In these drawings 10 is a circular table, mounted on legs 11, and having a series of rollers 12 fixed at spaced points around its outer edge, and a bearing 13 at its center. A carrier in the form of a turntable 14 is mounted on these rollers and a hub 15 bolted to the under-side of the turntable rests on the bearing 13. Fastened to this hub and passing through the bearing 13 to an end bearing 16 is a vertical shaft 17 which rotates the turntable, and is, in turn, rotated by beveled gears 18 connecting the vertical shaft with a horizontal shaft 19 extending to the table's edge where it is connected with a belt driven wheel 20 by a clutch 21 controlled by a foot lever 22.

Mounted on the top of the carrier are a plurality, herein shown as three in number, of plates 23, each of which has a top 24 made of insulating material such as rubber composition, mounted on a metal disk 25 from which a pivot or pin 26 projects downwardly through a hole in the carrier. This pin causes the disk to move with the carrier and permits it also to oscillate thereon. The movements of each plate on the carrier are controlled by a crank arm 27 fastened at its inner end to the part of the pin projecting below the turntable 14 and having on its outer end a vertical pin 28 carrying a roller 29. This roller moves in an endless cam groove 30 defined by angle irons 31 fastened to the top of the table 10.

The battery jars 32 are placed on conductive iron mandrels 33 constituting electrodes, fastened to the top of the plate 23 so that they will turn with the latter, by means including a pin 34 which also forms an electrical connection between the mandrel and a radially disposed wire 35 embedded in the non-conducting disk 24. At the outer end of the wire is a narrow contact strip or plate 36 bent into an arc along the edge of the mandrel-supporting plate 23.

At spaced points along the edge of the carrier are a plurality (in the present case two) of insulated supports 37, 38, bolted to the fixed table 10. Each support has vertical arms 39, 40 joined at the top by a horizontal arm 41 forming an inverted U-shaped bracket which straddles the mandrels as they pass by.

42, 42 are vertical discharge brushes or electrodes adjustably supported on the arms 39, 40 of the bracket 37 by horizontal rods 43 slidably mounted in insulating plugs 44 extending through the arms and having set screws 45 holding the brushes in adjusted positions. The horizontal arm 41 of the support 37 has two rearwardly-projecting lugs 46 in which vertical rods 47 supporting a horizontal brush 48 are secured by set screws 49. This brush is behind brushes 42 and is long enough to permit an adjustment of the three brushes and still maintain an overlapping of the brush ends to insure a contact between the latter and around the bottom of the jar. On the vertical arms 39, 40 of the second support 38 are plugs 50 having set screws 51 holding rods 52 in adjusted horizontal positions, these rods supporting on their inner ends vertical discharge brushes 53. These brushes are spaced apart the width of a jar to permit a side-wise movement of the latter therebetween instead of the end-wise movement between the vertical brushes 42. At least one of each pair of brush supporting rods 43, 47 and 52 are connected by wires 54 in an electrical circuit of high voltage.

A narrow contact plate 55 is bent into an arc along the edge of the turntable on the inside of the brackets and is held in the horizontal plane of the contact plate 36 by rods 56 slidably mounted in insulating plugs 57 in the arms 39, and rods 58 similarly mounted in plugs 59 supported by small brackets 60 fastened to the fixed table 10 between the larger supports 37, 38. The curvature of the long plate 55 may be varied by loosening set screws 61 carried by each of these plugs and sliding the rods relative to the latter. One or more of these rods are connected by wires 62 to the opposite end of the same electrical circuit in which the brushes are connected. When a contact plate 36 on a mandrel carrier engages the fixed contact plate 55 the mandrel and brushes have opposite charges of a sufficiently high potential to produce a current flow in the form of sparks through defective parts of the insulation between the electrodes.

In my preferred method of operating the machine, three workmen are employed, one standing near the point A to place fresh jars on the mandrels, a second standing between the brush supporting arms to note sparks passing through the jar walls from one electrode to the other, and a third standing near the point B to remove the tested jars. The turn table is rotated in a counter-clockwise direction, as viewed in Fig. 1, to move the mandrels from unloading position to loading position, then through the U-shaped electrode and finally between the parallel brushes 53 back to unloading position. The cam groove is so shaped that as the jars pass from B to A the position of each jar relative to the carrier is not changed thus facilitating the reloading of the mandrels. As the jars approach and pass between the first set of brush electrodes, the supporting plates 23 are turned to bring two opposite sides and the bottom of a jar close to or in contact with the metal bristles which may be made long and flexible so they will sweep over the jar surfaces and especially the side corners and the bottom edges of the jar. When passing from the first set of brushes to the second set the mandrel supports are rotated on the turn table to present the intermediate pair of opposed sides of the jar to the second vertical brush electrodes 53. If there are minute air holes, carbon particles or other impurities in the jar walls, sparks jump through the walls, burning the holes larger or burning out the particles so that the defective places are easily found. If the second operator notes sparks on the face of a brush he signals to the third operator, as by means of a colored light turned on momentarily, and the third operator places the defective jar on a separate truck from that on which the perfect jars are placed.

The machine may be operated as fast as tested jars can be replaced by untested jars, for the current used is so strong that the jars are thoroughly tested when passed rapidly between the brushes. The only parts handled by the operators are the jars themselves and the latter are out of contact with the charged members during the reloading of the mandrels thus eliminating all danger to the workmen. The long metal bristles of the fixed electrodes preferably contact with the jar walls, and the overlapping bristles at the corners of the U-shaped electrode rub against the corners and edges around the bottom of the jar, insuring a thorough testing of all parts of the insulation without the manual operation of any of the charged members. The brushes 42 and 53 constitute an organization of brushes which is caused, by the automatic means described, to sweep intersecting sides of the jar lying in the same circumferential zone, as distinguished from devices heretofore used in which electric elements are applied only to non-intersecting sides of the article, such as the two opposite faces of a piece of sheet material.

The mandrels may be removed and mandrels of other shapes and sizes fastened on the plates 23, and the relative positions of the brushes may be changed to test jars of any shape or size. If the jars or other articles to be tested have more than four side walls, the number of sets of brushes and the shape of the cam may be varied accordingly.

While I have shown and described one specific embodiment of my invention for testing battery jars it is understood that the invention may be embodied in other forms and that the particular construction shown and described may be departed from to test articles other than battery jars.

I claim:

1. In an apparatus for testing the dielectric properties of receptacles such as storage-battery jars, the combination of an electrode to enter the receptacle, an organization of brushes, a high-tension circuit including said electrode and brushes, and means for causing said brushes to sweep intersecting sides of the receptacle in the same zone.

2. An insulation testing device comprising a pair of relatively movable electrodes included in a high-tension circuit and means for passing one electrode by the other in spaced relation thereto with the insulation to be tested lying between opposed surfaces of the electrodes.

3. An insulation testing device comprising a pair of relatively movable electrodes, one of which is adapted to carry the dielectric article to be tested, and means for including said electrodes in a high-tension circuit when in adjacent positions, and for disconnecting the carrying electrode from said circuit when remote from the other electrode to permit a reloading of the carrier electrode without danger to the operator.

4. In an apparatus for testing battery jars, the combination of a jar-supporting mandrel forming an electrode, a substantially U-shaped brush structure forming a second electrode, and means for producing a relative movement of the two causing the mandrel to pass through the U-shaped electrode.

5. In an apparatus for testing battery jars, a movable electrode over which a battery jar may be placed, a second electrode comprising three discharge brushes arranged in the shape of a U and means for moving the first named electrode through the U-shaped electrode to cause the brushes thereof to sweep over three sides of the jar.

6. An apparatus for testing battery jars comprising a movable electrode adapted to receive and contact with the inner walls of a jar to be tested, spaced fixed electrodes, and means for guiding the first named electrode past the fixed electrodes to present different jar faces to each of the latter.

7. In an apparatus for testing battery jars the combination of a mandrel forming an electrode, means for moving said mandrel in a predetermined path, and two sets of brush electrodes located in successive positions along said path and adapted respectively to sweep alternate pairs of sides of a jar mounted on said mandrel.

8. In an apparatus for testing battery jars, the combination of an electrode adapted to receive a jar to be tested, a brush structure, and means for relatively so moving and guiding said electrode and brush structure as to cause the latter to sweep all sides of the jar.

9. In an apparatus for testing battery jars, a carrier, an electrode adapted to support a battery jar, said electrode being movable with and relatively to the carrier, a fixed brush structure, means for moving the carrier to pass said electrode by the brush structure, and means for so moving said electrode relatively to the carrier as to present all sides of the jar to the brush structure.

10. In an apparatus for testing battery jars, a carrier, an electrode adapted to support a battery jar, said electrode being movable with and relative to the carrier, a plurality of spaced fixed brushes adjacent the carrier, means for moving the carrier to pass the electrode by the brushes, and means for so moving said electrode relatively to the carrier as to present different jar faces to the different brushes.

11. In an apparatus for testing battery jars, the combination of a rotary carrier, a mandrel for a battery jar mounted to oscillate thereon and constituting an electrode, two sets of fixed brushes located at successive positions along the path of said mandrel and a fixed cam adapted so to oscillate said mandrel as to cause one set of brushes to sweep two opposite sides of the jar and the second set to sweep the two intermediate sides.

12. In an apparatus for testing battery jars, a turntable, a jar-supporting mandrel electrode mounted to oscillate thereon, a plurality of sets of brushes located at successive positions along the path of said electrode, an endless fixed cam for oscillating said electrode while the latter is being moved from one set of brushes to another, to present different jar faces to the different sets of brushes, and means for rotating the turntable continuously in one direction.

13. In an apparatus for testing battery jars, a fixed brush structure, a carrier, a mandrel electrode movable therewith and adapted to hold a jar to be tested, a contact movable with and connected to said electrode, a fixed contact adjacent the brush structure, and means for moving the carrier to bring the mandrel electrode opposite the brush structure and the movable contact into operative relation with the fixed contact, whereby current may flow between the mandrel electrode and the brush structure through defective parts of a jar wall.

14. In an apparatus for testing battery jars, a conductive mandrel for receiving a jar to be tested, a fixed U-shaped brush structure adapted to sweep over two opposite sides and the end wall of the jar, a second fixed brush structure having opposed brushes adapted to sweep over the intermediate sides of the jar, and means for moving said mandrel through said brush structures and for turning the jar as it passes from the first to the second thereof to present alternate pairs of jar sides to the two brush structures.

In witness whereof I have hereunto set my hand this 1st day of Dec., 1920.

JOHN R. GAMMETER.